US009519429B2

(12) United States Patent  
Grimsrud

(10) Patent No.: US 9,519,429 B2  
(45) Date of Patent: Dec. 13, 2016

(54) TECHNIQUES TO MANAGE MULTIPLE SEQUENTIAL WRITE STREAMS TO A SOLID STATE DRIVE

(71) Applicant: Intel Corporation, Santa Clara, CA (US)

(72) Inventor: Knut S. Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 14/565,319

(22) Filed: Dec. 9, 2014

(65) Prior Publication Data

US 2016/0162203 A1  Jun. 9, 2016

(51) Int. Cl.
  *G06F 12/00* (2006.01)
  *G06F 3/06* (2006.01)
  *G06F 12/02* (2006.01)

(52) U.S. Cl.
  CPC .......... *G06F 3/0613* (2013.01); *G06F 3/0659* (2013.01); *G06F 3/0679* (2013.01); *G06F 12/0246* (2013.01)

(58) Field of Classification Search
  CPC .. G06F 12/0246; G06F 3/0613; G06F 3/0659; G06F 3/0679; G06F 12/804; G06F 12/0866; G06F 2212/2022; G06F 2212/7211; G11C 16/00

USPC .................................................. 711/103, 115  
See application file for complete search history.

(56) References Cited

U.S. PATENT DOCUMENTS

| | | |
|---|---|---|
| 2011/0231596 A1 | 9/2011 | Goss et al. |
| 2013/0346724 A1 | 12/2013 | Ranade et al. |
| 2014/0075105 A1 | 3/2014 | Colgrove et al. |
| 2014/0136575 A1 | 5/2014 | Zhao et al. |
| 2016/0077745 A1* | 3/2016 | Patel ..................... G06F 3/0608 714/704 |

FOREIGN PATENT DOCUMENTS

WO  2012/060824 A1  5/2012

OTHER PUBLICATIONS

International Search Report and Written Opinion received for International Application No. PCT/US2015/061959, mailed on Mar. 11, 2016, 9 pages.

* cited by examiner

*Primary Examiner* — Midys Rojas  
*Assistant Examiner* — Tasnima Matin  
(74) *Attorney, Agent, or Firm* — Alpine Technology Law Group LLC

(57) ABSTRACT

Examples may include techniques to manage multiple sequential write streams to a solid state drive (SSD). Wrap around times for each sequential write stream may be determined. Respective wrap around times for each sequential write stream may be changed for at least some of the sequential write streams to cause the multiple sequential write streams to have matching wrap around times.

25 Claims, 8 Drawing Sheets

System 100

600

MONITOR SEPARATE WRITE RATES TO AN SSD FOR EACH SEQUENTIAL WRITE STREAM OF A MULTITUDE OF SEQUENTIAL WRITE STREAMS MERGED FOR WRITING TO THE SSD OVER A FIRST TIME INTERVAL
602

DETERMINE SEPARATE WRAP AROUND TIMES FOR EACH SEQUENTIAL WRITE STREAM BASED ON RESPECTIVE MONITORED SEPARATE WRITE RATES
604

CAUSE THE SEPARATE WRAP AROUND TIMES FOR EACH SEQUENTIAL WRITE STREAM TO SUBSTANTIALLY MATCH FOR SUBSEQUENT WRITES TO THE SSD FOLLOWING THE FIRST TIME INTERVAL
606

*FIG. 6*

Storage Medium 700

*Computer Executable Instructions for 600*

*FIG. 7*

TECHNIQUES TO MANAGE MULTIPLE SEQUENTIAL WRITE STREAMS TO A SOLID STATE DRIVE

TECHNICAL FIELD

Examples described herein are generally related to managing multiple sequential write streams to a solid state drive.

BACKGROUND

Write amplification is a term used to describe a technical problem associated with types of non-volatile memory to include, but not limited to, NAND flash memory used in solid state drives (SSDs). Write amplification is described as a ratio of writes committed to non-volatile memory at an SSD to writes coming from a host computing platform. A ratio or write amplification value of around 1.0 is ideal when not employing data compression techniques. Typically, writes to non-volatile memory at the SSD may be done on a relatively small portion of non-volatile memory such as a 4 kilobyte (KB) page. However, non-volatile types of memory such as NAND flash memory erase much larger portions commonly referred to as blocks when erasing data stored in memory cells before rewriting data to these memory cells. An erasable block may include 64 or more pages (256 KB). Due to this disparity, a technique known as garbage collection may be used if data in some pages of a block are no longer needed (e.g., invalid/stale) and then valid or good data may be rewritten into another previously erased empty block. Higher amounts of garbage collection lead to higher vales for write amplification.

Write amplification may not be an issue for a single sequential write stream that results in sequential writes to pages included in a first block and then moving to a second block when all the pages in the first block are written to. Also, memory capacity for an SSD may be arranged in a manner such that once the single sequential write stream reaches an end of a sequence of blocks, the write stream wraps around or loops back to a beginning of the sequence. In some examples, if a sufficient memory capacity is available, by the time the single sequential write stream wraps around, the data written to pages for blocks at the beginning of the sequence all have become invalid or stale. In other words, no garbage collection is needed and a write amplification of 1.0 may be maintained.

Write amplification, however, may be an issue for random writes to the SSD. Random writes may result in a higher incidence of blocks being partially invalidated when a random write stream eventually wraps around and potentially large amounts of garbage collection may be needed to rewrite valid or good data to reclaim this valid data. Random writes to the SSD may result in a worse case write amplification for the SSD. High write amplification may reduce write performance for the SSD and may also increase wear on non-volatile memory cells that then leads to degraded endurance.

BRIEF DESCRIPTION OF THE DRAWINGS

FIG. 6 illustrates an example of a logic flow.
FIG. 7 illustrates an example of a storage medium.

DETAILED DESCRIPTION

As contemplated in the present disclosure, a single sequential write stream may have a write amplification of about 1.0 while random writes may result in a worse case write amplification (e.g., values that may be substantially higher than 1.0) for an SSD including non-volatile types of memory such as, but not limited to, NAND flash memory. However, if multiple sequential write streams are simultaneously provided to the SSD and merged together, a result more akin to random writes than to a single sequential write stream may occur. However, the multiple sequential write streams may have different variables that may result in different wrap around or loop times. Therefore, some sequential write streams may cause some blocks to have both valid and invalid data leading to an increased need for garbage collection and this may result in high write amplification values. It is with respect to these and other challenges that the examples described herein are needed.

Techniques to manage multiple sequential write streams to an SSD may be implemented via one or more example methods. An example method may include monitoring separate write rates to the SSD. For these examples, the separate write rates may be for each sequential write stream of a multitude of sequential write streams writing to the SSD over a first time interval. The example method may also include determining separate wrap around times for each sequential write stream based on respective monitored separate write rates. The example method may also include causing the separate wrap around times for each sequential write stream to substantially match for subsequent writes to the SSD following the first time interval.

Figure 1:
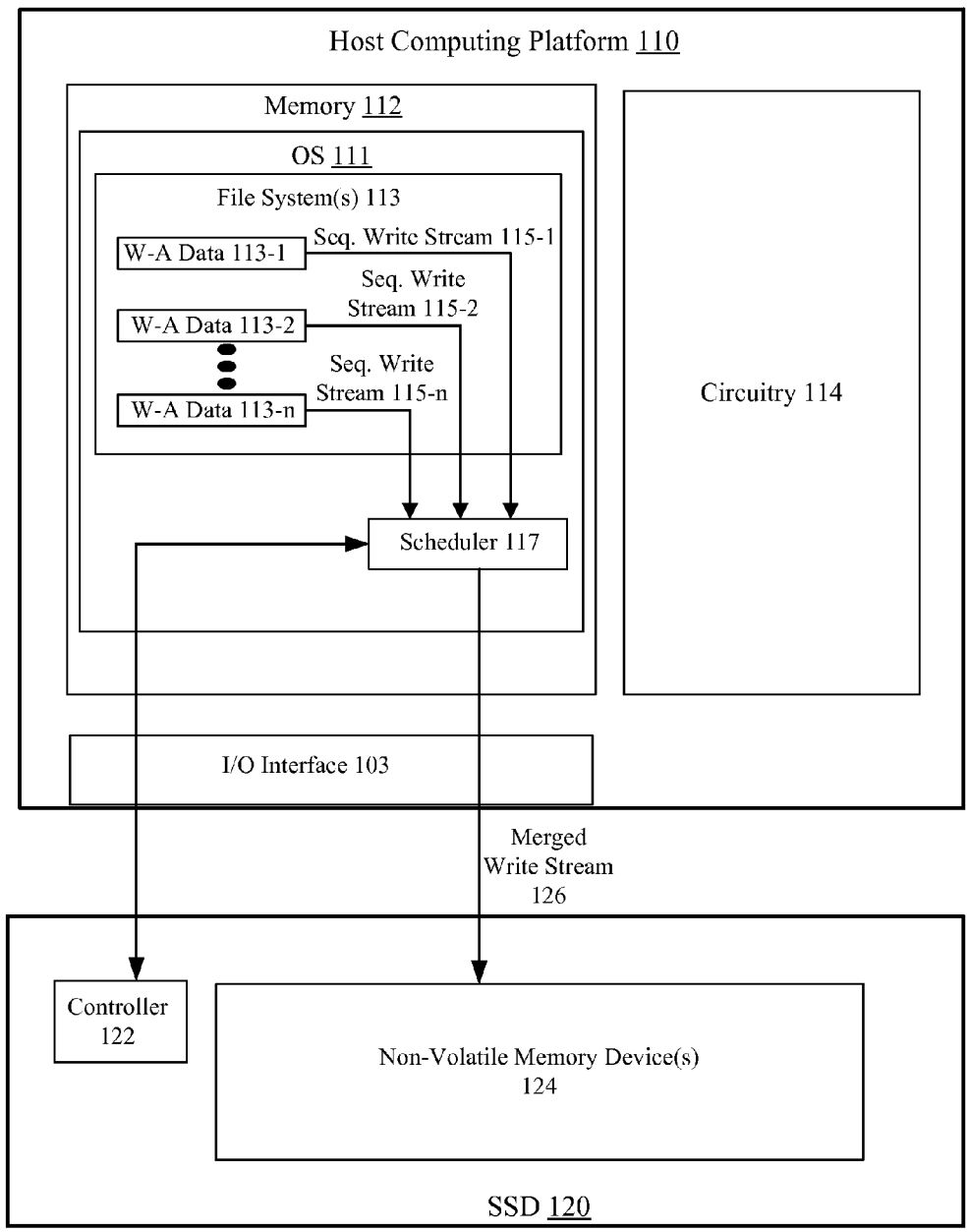
FIG. 1 illustrates an example first system.

FIG. 1 illustrates an example system 100. In some examples, as shown in FIG. 1, system 100 includes a host computing platform 110 coupled to a solid state drive (SSD) 120. Also, as shown in FIG. 1, host computing platform 110 may include memory 112 and circuitry 114. For these examples, circuitry 114 may be capable of executing various functional elements of host computing platform 110 maintained within memory 112. Circuitry 114 may include host processing circuitry to include one or more central processing units (CPUs) and associated chipsets and/or controllers. Memory 112 may include volatile types of memory such dynamic random access memory (DRAM). Types of DRAM for memory 112 may include, but are not limited to, various types of synchronous double data rate DRAM (DDR DRAM). These various types of DDR DRAM included in memory 112 may be compatible with a number of memory technologies such as, but not limited to, dual data rate version 3 (DDR3), originally released by the Joint Electronic Device Engineering Council (JEDEC) in June 2007, currently on release 21, DDR version 4 (DDR4), initial specification published in September 2012 by JEDEC, low power DDR version 3 (LPDDR3), JESD209-3B, published in August 2013 by JEDEC, LPDDR version 4 (LPDDR4), JESD209-4, originally published by JEDEC in August 2014 or Wide I/O 2 (WIO2), JESD229-2, originally published by JEDEC in August 2014.

According to some examples, host computing platform 110 may include, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. For these examples, an operating system (OS) 111 of host computing platform 110 may be maintained at least temporarily in memory 112 and may be executed by circuitry 114.

In some examples, OS 111 and circuitry 114 may be capable of supporting one or more multi-threaded programs (not shown). For these examples, file system(s) 113 may be implemented by OS 111 and the one or more multi-threaded programs may utilize file system(s) 113. As shown in FIG. 1, in some examples, file system(s) 113 may generate a multitude or plurality of write-append (W-A) data streams shown in FIG. 1 as W-A data 113-1 to 113-n, where "n" is any positive whole integer greater than 2, responsive to utilization of file systems(s) 113 by the one or more multi-threaded programs. For these examples, file system(s) 113 may be capable or arranged to use write-append techniques to first write data to W-A data 113-1 to 113-n maintained in memory 112 of host computing platform 110 and then cause W-A data 113-1 to 113-n to be written to a to SSD 120 via respective sequential write streams 115-1 to 115-n. File system(s) 113 capable of using write-append techniques may include a class of file systems such as, but not limited to, ZFS™ or OpenZFS, write anywhere file layout (WAFL) or garbage collecting object store file systems.

According to some example, OS 111 may be capable of implementing a scheduler 117 that may be capable of merging sequential writing streams 115-1 to 115-n to merged write stream 126. Scheduler 117 may then communicate with file system(s) 113 and/or controller 122 located at or with SSD 120 to facilitate the writing of merged write stream 126 to non-volatile memory device(s) 124 at SSD 120. According to some examples, communications between scheduler 117 and controller 122 and the writing of merged write stream 126 may be routed through an I/O interface 103. I/O interface 103 may be arranged as a Serial Advanced Technology Attachment (SATA) interface to couple host computing platform 110 to SSD 120. In another example, I/O interface 103 may be arranged as a Serial Attached Small Computer System Interface (SCSI) (or simply SAS) interface to couple host computing platform 110 to SSD 120. In another example, I/O interface 103 may be arranged as a Peripheral Component Interconnect Express (PCIe) interface to couple host computing platform 110 to SSD 120.

In some examples, as described more below, logic and/or features of a scheduler such as scheduler 117 may be capable of monitoring separate write rates for each sequential write stream of a multitude of sequential write streams merged for writing to an SSD such as SSD 120 over a first time interval, determine separate wrap around times for each sequential write stream and may cause the separate wrap around times for the sequential write streams to substantially match for subsequent writes to the SSD following the first time interval. Also as described more below, causing the separate wrap around times to substantially match may reduce or eliminate excessive write amplification that may result from merging multiple sequential write streams for writing to an SSD such as SSD 120.

According to some examples, non-volatile memory device(s) 124 at SSD 120 may include one or more non-volatile memory devices (e.g., chips) that may individually include one or more types of non-volatile memory to include, but not limited to, NAND flash memory, NOR flash memory, three dimensional (3-D) cross-point memory, ferroelectric memory, silicon-oxide-nitride-oxide-silicon (SO-NOS) memory, polymer memory such as ferroelectric polymer memory, ferroelectric transistor random access memory (FeTRAM) or FeRAM), ovonic memory, nanowire or electrically erasable programmable read-only memory (EEPROM).

Figure 2:
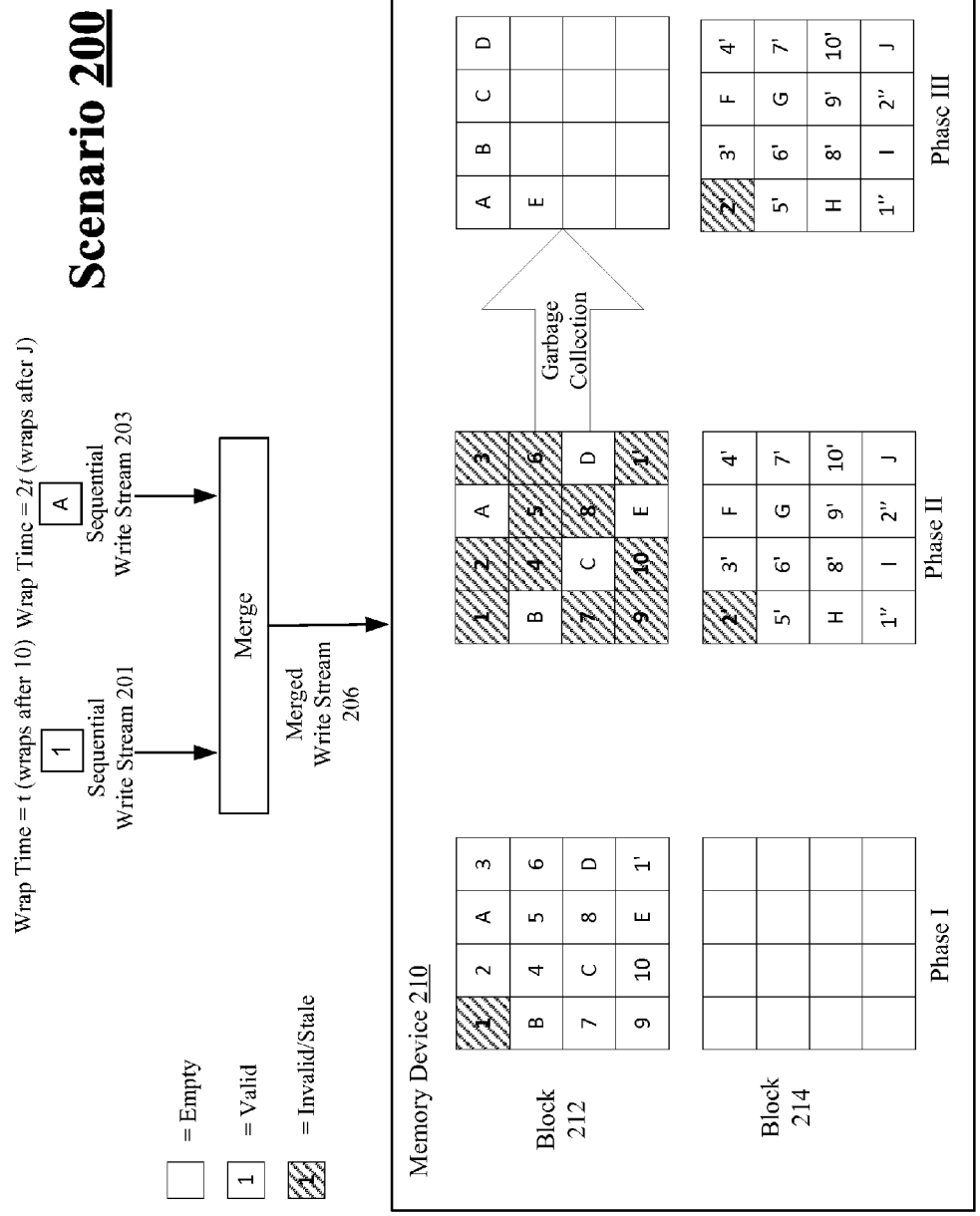
FIG. 2 illustrates an example first scenario.

FIG. 2 illustrates an example first scenario. As shown in FIG. 2, the example first scenario includes scenario 200. In some examples, scenario 200 depicts an example where sequential write stream 201 has a wrap around time of t and sequential write stream 203 has a wrap around time of 2t. For these examples, the lower wrap around time for sequential write stream 201 may be due to a file system associated with sequential write stream 201 causing sequential write stream 201 to have a write rate that is 2× that of the write rate for sequential write stream 203. So for these examples, sequential write stream 201 when merged with sequential write stream 203 will wrap around and invalidate data stored to a block of a memory device such as block 212 of memory device 210 twice as fast as sequential write stream 203.

In some examples, as shown in FIG. 2, sequential write streams 201 and 203 may be merged to form merged write stream 206 and then written to blocks of memory device 210 that may each include 16 pages. For these examples, each page is shown in FIG. 2 as a separate square of a respective block 212 or 214. Also for these examples, merged write stream 206 may be written to blocks of memory device 210 at phase I, II or III. At phase I, pages filled from sequential write stream 201 are depicted as numbers while pages filled from sequential write stream 201 are depicted as letters.

According to some examples, sequential write stream 201 may wrap around or invalidate previously written data after "10" or after the $10^{th}$ sequential number is written to memory device 210. Also, sequential write stream 203 may wrap around or invalidate previously written data after "J" or after the $10^{th}$ sequential letter is written to memory device 210. So as shown in FIG. 2 for block 212 at phase I, data written from sequential write stream 201 has already wrapped around to invalidate the page having the number "1". Yet, only 5 letters from sequential write stream 203 were written to block 212 at phase I. Next, at phase II, data written from sequential write stream 201 has not only wrapped around again for data written to block 214 but has also invalidated all of the pages previously written to for block 212. However, only 5 more letters (F-J) from sequential write stream 203 were written to block 214 at phase II and thus all previously written pages from sequential write stream 203 in block 212 are still valid. As a result of still being valid, letters A-D may then be garbage collected at phase III and rewritten to block 212. The pages from sequential write stream 201 in block 212, as previously mentioned, have been invalidated and thus may be erased without garbage collection.

So for this basic example of two merged sequential write streams, a write amplification of around to 1.4 has already occurred following an erase cycle for block 212. If a large number of sequential write streams are merged and each sequential write stream had different wrap around times, even higher write amplification values may result. Utilizing spare capacity of an SSD to allow slower sequential write streams to reach their respective wrap around times before erasing a previously written to block may mitigate or reduce write amplification. However, for SSDs designed to have low amounts of spare capacity, a multitude of merged sequential write stream with different wrap around times may likely result in unacceptably high write amplification values.

Figure 3:
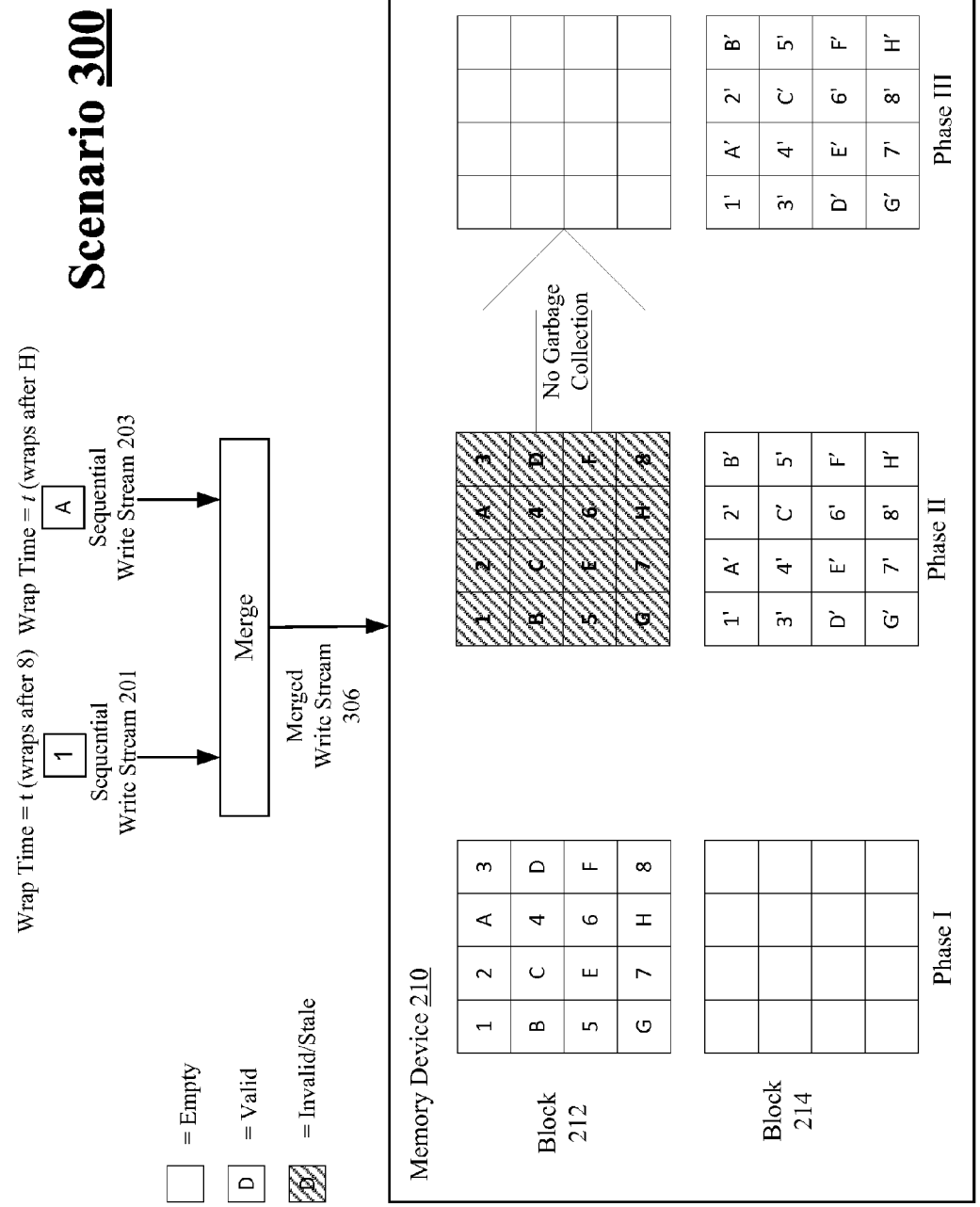
FIG. 3 illustrates an example second scenario.

FIG. 3 illustrates an example second scenario. As shown in FIG. 3, the example second scenario includes scenario 300. In some examples, scenario 300 depicts an example of where the faster writing sequential write stream 201 may have been throttled or load balanced to cause the wrap around time for sequential write stream 201 to substantially match the wrap around time for sequential write stream 203. So in some examples, at phase I, merged write stream 306 including merged sequential write streams 201 and 203 may now write to block 212 of memory device 210 at a same rate for both streams such they each wrap around following the $8^{th}$ number or letter. Therefore, at phase II, when writing to block 214, all the pages of 212 become invalidated for both sequential write streams and no garbage collection is needed at phase III.

According to some examples, logic and/or features at a scheduler may be capable of load balancing an amount of data to be written to an SSD having a memory device such as memory device 210. For these examples, load balancing the amount of data flowing from sequential write streams 201 and 203 may allow for the amount of data written to blocks 212 or 214 to be adjusted to either increase or decrease wrap around times. For example, a scheduler such as scheduler 117 shown in FIG. 1 may communicate with one or more file systems (e.g., file system(s) 113) to load balance an amount of write-append data included with each sequential write stream such that the wrap around time for sequential write stream 201 substantially matches sequential write stream 203.

In some examples, rather than load balance, the scheduler may throttle a first write rate for sequential write stream 201 to cause the first write rate to match a second write rate for sequential write stream 203. As a result of throttling the first write rate, the memory device 210 may be written to at a similar rate for both sequential write streams within merged write stream 306.

Figure 4:
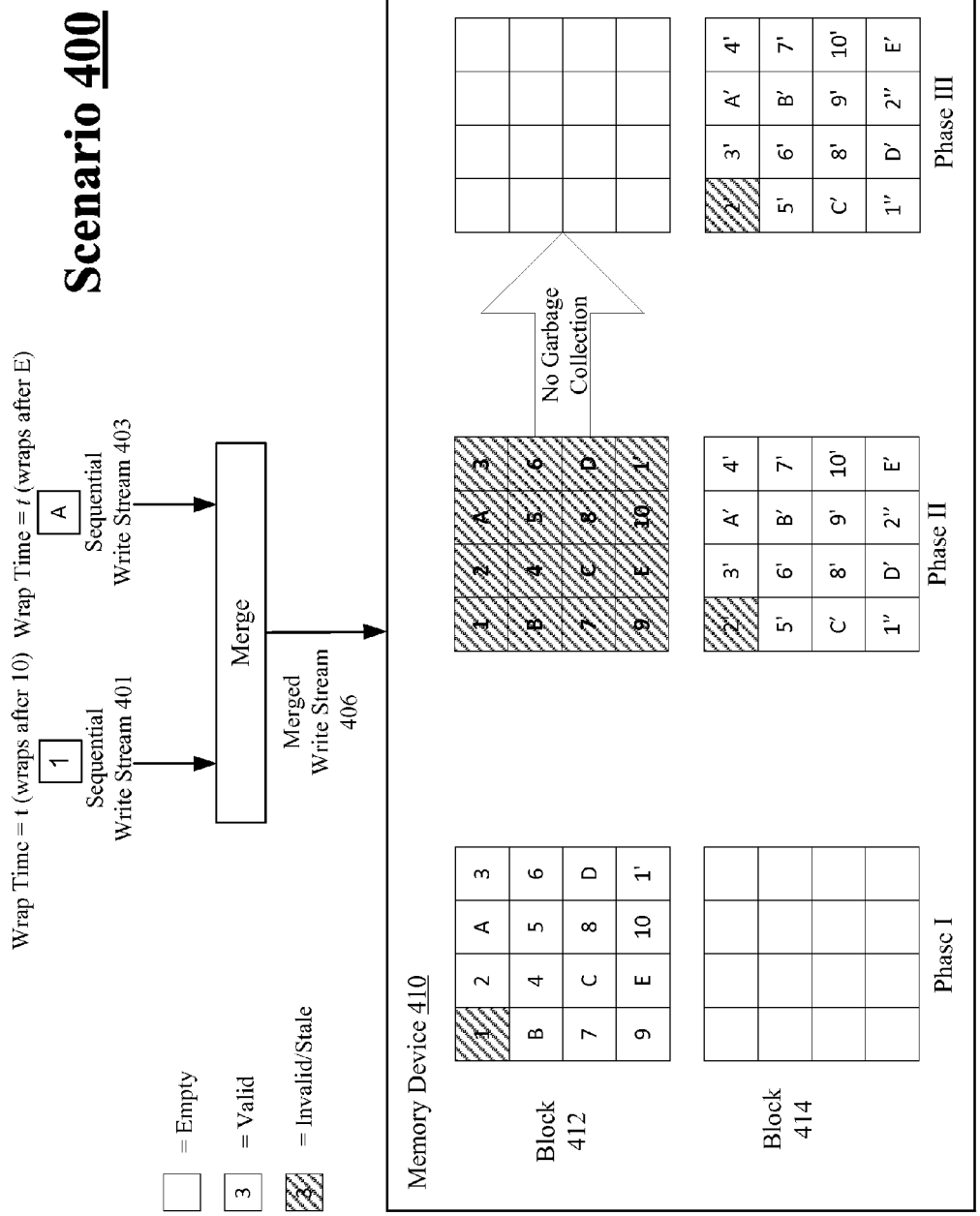
FIG. 4 illustrates an example third scenario.

FIG. 4 illustrates an example third scenario. As shown in FIG. 4, the example third scenario includes scenario 400. In some examples, scenario 400 depicts an example of where allocated portions have been adjusted to cause wrap around times to substantially match for sequential write streams 401 and 403. For these examples, logic and/or features at a scheduler may be capable of adjusting allocated portions allocated to sequential write streams 401 and 403 when included in merged write stream 406 such that a larger portion is allocated to sequential write stream 401 that may have a write rate that is 2× or twice that of sequential write stream 403. Also, a lower portion may be allocated to sequential write stream 403. As shown in FIG. 4, reallocation may result in causing data from sequential write stream 401 to wrap around following a $10^{th}$ page being written to. Reallocation may also result in causing data from sequential write stream 403 to wrap around following a $5^{th}$ page being written to. For these examples, by phase II all pages of block 412 may be invalidated as shown in FIG. 4 and garbage collection may not be needed at phase III.

Figure 5:
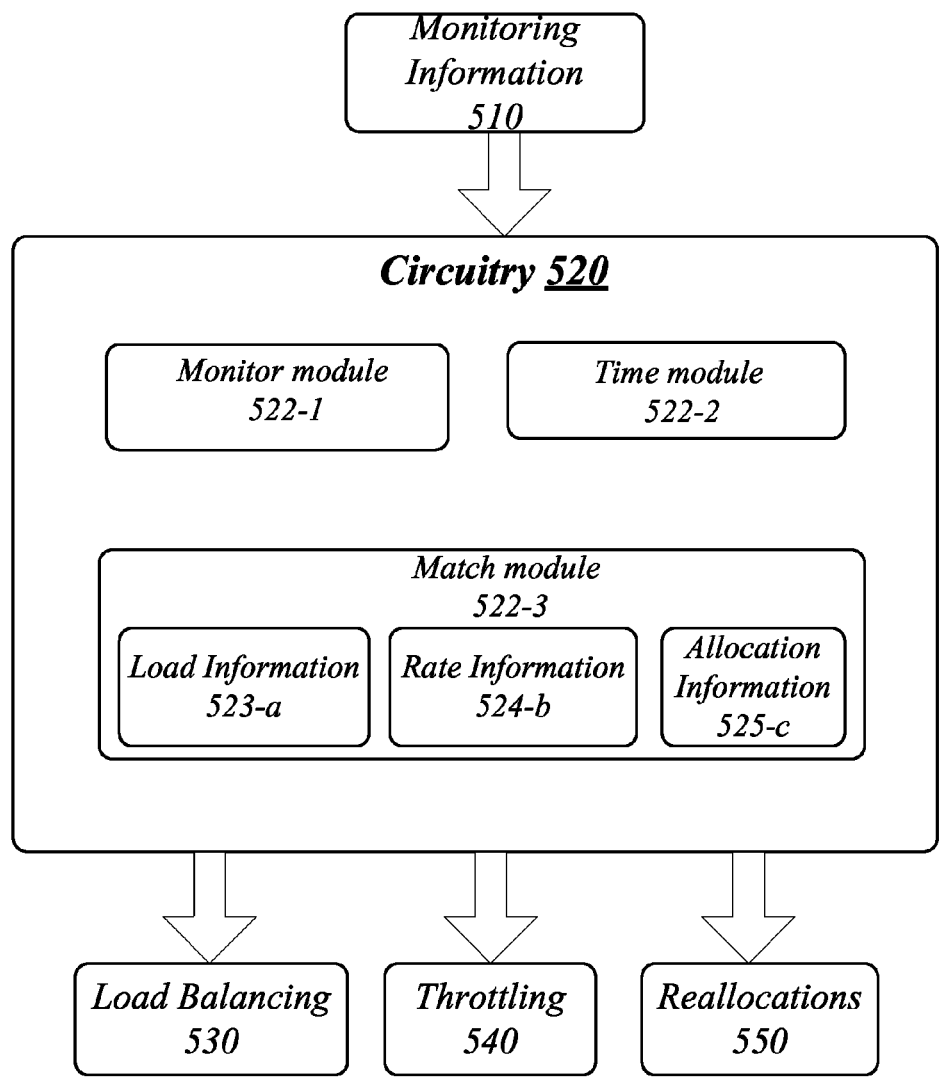
FIG. 5 illustrates an example block diagram for an apparatus.

FIG. 5 illustrates an example block diagram for an apparatus 500. Although apparatus 500 shown in FIG. 5 has a limited number of elements in a certain topology, it may be appreciated that the apparatus 500 may include more or less elements in alternate topologies as desired for a given implementation.

The apparatus 500 may be supported by circuitry 520 maintained at a host computing platform similar to circuitry 114 at host computing platform 110 shown in FIG. 1. The host computing platform may be coupled to an SSD similar to SSD 120 also shown in FIG. 1. Circuitry 520 may be arranged to execute one or more software or firmware implemented components or modules 522-*a* (e.g., implemented as part of a storage device driver by an OS for the host computing platform). It is worthy to note that "a" and "b" and "c" and similar designators as used herein are intended to be variables representing any positive integer. Thus, for example, if an implementation sets a value for a=3, then a complete set of software or firmware for components or modules 522-*a* may include modules 522-1, 522-2 or 522-3. The examples presented are not limited in this context and the different variables used throughout may represent the same or different integer values.

According to some examples, circuitry 520 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 520 may also be an application specific integrated circuit (ASIC) and at least some modules 522-*a* may be implemented as hardware elements of the ASIC.

According to some examples, apparatus 500 may include a monitor module 522-1. Monitor module 522-1 may be executed by circuitry 520 to monitor separate write rates for each sequential write stream of a multitude of sequential write streams merged for writing to an SSD coupled to the host computing platform maintaining apparatus 500. For these examples, the write rate may be monitored by monitor module 522-1 over a first time interval to obtain monitoring information 510.

In some examples, apparatus 500 may also include a time module 522-2. Time module 522-2 may be executed by circuitry 520 to determine separate wrap around times for each sequential write stream based on respective monitored separate write rates by monitor module 522-1. For these examples, time module 522-2 may use the monitoring information gathered by monitor module 522-1 to determine the separate wrap around times.

According to some examples, apparatus 500 may also include a match module 522-3. Match module 522-3 may be executed by circuitry 520 to cause the separate wrap around times for each sequential write stream to substantially match for subsequent writes to the SSD following the first time interval. For these examples, match module 522-3 may be capable of maintaining load information 523-*a*, rate information 524-*b* and allocation information 525-*c* in data structures such as a lookup table (LUT) to assist in causing each sequential write stream's wrap around times to substantially match.

In some examples, match module 522-3 may cause separate wrap around times for each sequential write stream to substantially match via use of load information 523-*a* to cause a load balancing of an amount of data to be written to the SSD over a second time interval between the multitude of sequential write streams. The load balancing may occur such that first and second write streams of the multitude of sequential write streams having different write rates are load-balanced by match module 522-3 to cause the amount of data to be written to the SSD by the respective first and second write streams over the second time interval to be adjusted. For these examples, the adjusted amount of data may be capable of causing the wrap around times to substantially match for the first and second write streams. Load balancing 530 may include information from load information 523-*a* to indicate adjusted amounts of data for load balancing. Match module 522-3 may cause the amount of data to be adjusted via sending load balancing 530 to one or more file system(s) that may then adjust the amount of data to be written to the SSD for each sequential write stream based on the information included in load balancing 530.

According to some examples, match module 522-3 may cause separate wrap around times for each sequential write stream to substantially match via use of rate information 524-*b* to cause a throttling of write rates for at least some write streams of the multitude of sequential write streams. The throttling may occur such that a first write stream of the multitude of sequential write streams having a shorter first wrap around time compared to a second write stream of the multitude of sequential write streams has a throttled write rate capable of causing the wrap around times to substantially match for the first and second write streams. Throttling 540 may include information from rate information 524-*b* that indicates an amount of throttling needed. Match module 522-3 may cause the throttling via sending throttling 540 to one or more file system(s) that may then throttle the write rates based on the information included in throttling 540.

In some examples, match module 522-3 may cause separate wrap around times for each sequential write stream to substantially match via use of allocation information 525-*c* to cause an adjustment to allocated portions allocated to each sequential write stream merged for writing to the SSD. The adjustment may occur such that a larger portion is allocated to a first write stream of the multitude of sequential write streams that has a shorter determined wrap around time compared to a second write stream of the multitude of sequential write streams. The larger allocated portion to the first write stream may be capable of causing the wrap around times to substantially match for the first and second write streams. Reallocations 550 may include information from allocation information 525-*c* that indicates the adjusted allocations. Match module 522-3 may cause the adjustment to the allocated portions via sending reallocations 550 to one or more file system(s) that may then adjust the allocated portions based on the information included in reallocations 550.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates an example of a logic flow 600. Logic flow 600 may be representative of some or all of the operations executed by one or more logic, features, or devices described herein, such as apparatus 500. More particularly, logic flow 600 may be implemented by monitor module 522-1, time module 522-2 or match module 522-3.

According to some examples, logic flow 600 at block 602 may monitor separate write rates to an SSD for each sequential write stream of a multitude of sequential write streams merged for writing to the SSD over a first time interval. For these examples, monitor module 522-1 may monitor the separate write rates.

In some examples, logic flow 600 at block 604 may determine separate wrap around times for each sequential write stream based on respective monitored separate write rates. For these examples time module 522-2 may determine the separate wrap around times.

According to some examples, logic flow 600 at block 606 may cause the separate wrap around times for each sequential write stream to substantially match for subsequent writes to the SSD following the first time interval. For these examples, match module 522-3 may cause the separate wrap around times to substantially match.

FIG. 7 illustrates an example of a first storage medium. As shown in FIG. 7, the first storage medium includes a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
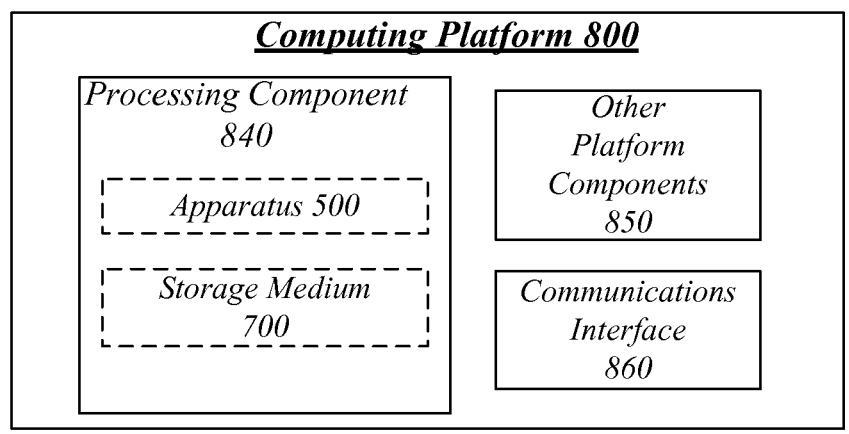
FIG. 8 illustrates an example computing platform.

FIG. 8 illustrates an example computing platform 800. In some examples, as shown in FIG. 8, computing platform 800 may include a processing component 840, other platform components or a communications interface 860. According to some examples, computing platform 800 may be part of a host computing platform as mentioned above.

According to some examples, processing component 840 may execute processing operations or logic for apparatus 500 and/or storage medium 700. Processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements or circuitry, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols or standards described in one or more industry standards (including progenies and variants) such as those associated with the SMBus specification or the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3").

Computing platform 800 may be part of a host computing platform that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 800 described herein, may be included or omitted in various embodiments of computing platform 800, as suitably desired.

The components and features of computing platform 800 may be implemented using any combination of discrete circuitry, application specific integrated circuits (ASICs), logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry for a host computing platform coupled with an SSD. The example apparatus may also include a monitor module for execution by the circuitry that may monitor separate write rates for each sequential write stream of a multitude of sequential write streams merged for writing to the SSD over a first time interval. The example apparatus may also include a time module for execution by the circuitry that may determine separate wrap around times for each sequential write stream based on respective monitored separate write rates by the monitor module. The example apparatus may also include a match module for execution by the circuitry that may cause the separate wrap around times for each sequential write stream to substantially match for subsequent writes to the SSD following the first time interval.

Example 2

The apparatus of example 1, the time module may determine separate wrap around times based on a given wrap around time being a time difference between a first time data is written to a given block of memory at the SSD and a second time for which the data is invalidated.

Example 3

The apparatus of example 1, the multitude of sequential write streams may be generated by one or more file systems implemented by an operating system of the host computing platform. The one or more file systems may be capable of using write-append techniques to write data to a memory of the host computing platform and then cause the write-appended data to be written to the SSD via the multitude of sequential write streams.

Example 4

The apparatus of example 3, the operating system may be executed by the circuitry for the host computing platform.

For these examples, the monitor module, the time module and the match module may be part of a scheduler implemented by the operating system. The scheduler may be capable of merging the multitude of sequential write streams for writing to the SSD.

Example 5

The apparatus of example 1, the match module may cause the separate wrap around times for each sequential write stream to substantially match such that a ratio of actual writes to the SSD to writes from the multitude of sequential write streams is substantially equal to a value of 1.0.

Example 6

The apparatus of example 1, the match module to cause the separate wrap around times for each sequential write stream to substantially match may include the match module to cause a load balancing of an amount of data to be written to the SSD over a second time interval between the multitude of sequential write streams such that first and second write streams of the multitude of sequential write streams having different write rates and are load-balanced by the match module causing the amount of data to be written to the SSD by the respective first and second write streams over the second time interval to be adjusted. For these examples, the adjusted amount of data may be capable of causing the wrap around times to substantially match for the first and second write streams.

Example 7

The apparatus of example 1, the match module to cause the separate wrap around times for each sequential write stream to substantially match may include the match module to cause a throttling of write rates for at least some write streams of the multitude of sequential write streams such that a first write stream of the multitude of sequential write streams having a shorter first wrap around time compared to a second write stream of the multitude of sequential write streams has a throttled write rate capable of causing the wrap around times to substantially match for the first and second write streams.

Example 8

The apparatus of example 1, the match module to cause the separate wrap around times for each sequential write stream to substantially match may include the match module to cause an adjustment to allocated portions allocated to each sequential write stream merged for writing to the SSD such that a larger portion is allocated to a first write stream of the multitude of sequential write streams that has a shorter determined wrap around time compared to a second write stream of the multitude of sequential write streams. For these examples, the larger allocated portion to the first write stream may be capable of causing the wrap around times to substantially match for the first and second write streams.

Example 9

The apparatus of example 8 may also include the monitor module to monitor separate write rates for each sequential write stream of the multitude of sequential write streams merged for writing to the SSD over a second time interval. For these examples, the time module may determine a second set of separate wrap around times for each sequential write stream based on respective monitored separate write rates over the second time interval by the monitor module. The match module may then cause the second set of separate wrap around times for each sequential write stream to substantially match for writes to the SSD following the second time interval.

Example 10

The apparatus of example 1, the SSD including at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

Example 11

An example method may include monitoring separate write rates to an SSD for each sequential write stream of a multitude of sequential write streams merged for writing to the SSD over a first time interval. The method may also include determining separate wrap around times for each sequential write stream based on respective monitored separate write rates and causing the separate wrap around times for each sequential write stream to substantially match for subsequent writes to the SSD following the first time interval.

Example 12

The method of example 11, the separate wrap around times may be determined based on a given wrap around time being a time difference between a first time data is written to a given block of memory at the SSD and a second time for which the data is invalidated.

Example 13

The method of example 11, the multitude of sequential write streams may be generated by one or more file systems implemented by an operating system of the host computing platform. For these examples, the one or more file systems may be capable of using write-append techniques to write data to a memory of the host computing platform and then cause the write-appended data to be written to the SSD via the multitude of sequential write streams.

Example 14

The method of example 11 may also include causing the separate wrap around times for each sequential write stream to substantially match such that a ratio of actual writes to the SSD to writes from the multitude of sequential write streams is substantially equal to a value of 1.0.

Example 15

The method of example 11, causing the separate wrap around times for each sequential write stream to substantially match may include load balancing an amount of data to be written to the SSD over a second time interval between the multitude of sequential write streams such that first and second write streams of the multitude of sequential write streams having different write rates are load-balanced by adjusting the amount of data to be written to the SSD by the respective first and second write streams over the second time interval. For these examples, the adjusted amount of data may be capable of causing the wrap around times to substantially match for the first and second write streams.

Example 16

The method of example 11, causing the separate wrap around times for each sequential write stream to substantially match may include throttling write rates for at least some write streams of the multitude of sequential write streams such that a first write stream of the multitude of sequential write streams having a shorter first wrap around time compared to a second write stream of the multitude of sequential write streams has a throttled write rate capable of causing the wrap around times to substantially match for the first and second write streams.

Example 17

The method of example 11, causing the separate wrap around times for each sequential write stream to substantially match may include adjusting allocated portions allocated to each sequential write stream merged for writing to the SSD such that a larger portion is allocated to a first write stream of the multitude of sequential write streams that has a shorter determined wrap around time compared to a second write stream of the multitude of sequential write streams, the larger allocated portion to the first write stream capable of causing the wrap around times to substantially match for the first and second write streams.

Example 18

The method of example 11 may also include monitoring separate write rates for each sequential write stream of the multitude of sequential write streams merged for writing to the SSD over a second time interval. The method may also include determining a second set of separate wrap around times for each sequential write stream based on respective monitored separate write rates over the second time interval. The method may also include causing the second set of separate wrap around times for each sequential write stream to substantially match for writes to the SSD following the second time interval.

Example 19

The method of example 11, the SSD including at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

Example 20

An example at least one machine readable medium may include a plurality of instructions that in response to being executed by system at a host computing platform may cause the system to carry out a method according to any one of examples 11 to 19.

Example 21

An example apparatus may include means for performing the methods of any one of examples 11 to 19.

Example 22

An example at least one machine readable medium may include a plurality of instructions that in response to being executed on system at a host computing platform may cause the system monitor separate write rates for each sequential write stream of a multitude of sequential write streams merged for writing to an SSD coupled with the host computing platform over a first time interval. The instructions may also cause the system to determine separate wrap around times for each sequential write stream based on respective monitored separate write rates and cause the separate wrap around times for each sequential write stream to substantially match for subsequent writes to the SSD following the first time interval.

Example 23

The at least one machine readable medium of example 22, the separate wrap around times may be determined based on a given wrap around time being a time difference between a first time data is written to a given block of memory at the SSD and a second time for which the data is invalidated.

Example 24

The at least one machine readable medium of example 22, the multitude of sequential write streams may be generated by one or more file systems implemented by an operating system of the host computing platform. For these examples, the one or more file systems may be capable of using write-append techniques to write data to a memory of the host computing platform and then cause the write-appended data to be written to the SSD via the multitude of sequential write streams.

Example 25

The at least one machine readable medium of example 22 may also include causing the separate wrap around times for each sequential write stream to substantially match such that a ratio of actual writes to the SSD to writes from the multitude of sequential write streams is substantially equal to a value of 1.0.

Example 26

The at least one machine readable medium of example 22, causing the separate wrap around times for each sequential write stream to substantially match may include the instructions to cause the system to load balance an amount of data to be written to the SSD over a second time interval between the multitude of sequential write streams such that first and second write streams of the multitude of sequential write streams having different write rates are load-balanced by adjusting the amount of data to be written to the SSD by the respective first and second write streams over the second time interval, the adjusted amount of data capable of causing the wrap around times to substantially match for the first and second write streams.

Example 27

The at least one machine readable medium of example 22, causing the separate wrap around times for each sequential write stream to substantially match may include the instructions to cause the system to throttle write rates for at least some write streams of the multitude of sequential write streams such that a first write stream of the multitude of sequential write streams having a shorter first wrap around time compared to a second write stream of the multitude of sequential write streams has a throttled write rate capable of causing the wrap around times to substantially match for the first and second write streams.

Example 28

The at least one machine readable medium of example 22, causing the separate wrap around times for each sequential write stream to substantially match may include the instructions to cause the system to adjust allocated portions allocated to each sequential write stream merged for writing to the SSD such that a larger portion is allocated to a first write stream of the multitude of sequential write streams that has a shorter determined wrap around time compared to a second write stream of the multitude of sequential write streams. For these examples, the larger allocated portion to the first write stream may be capable of causing the wrap around times to substantially match for the first and second write streams.

Example 29

The at least one machine readable medium of example 22, the instructions to may further cause the system to monitor separate write rates to the SSD for each sequential write stream of the multitude of sequential write streams merged for writing to the SSD over a second time interval. The instructions may also cause the system to determine a second set of separate wrap around times for each sequential write stream based on respective monitored separate write rates over the second time interval and cause the second set of separate wrap around times for each sequential write stream to substantially match for writes to the SSD following the second time interval.

Example 30

The at least one machine readable medium of example 22, the SSD including at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry for a host computing platform coupled with a solid state drive (SSD);
   a monitor module for execution by the circuitry to monitor separate write rates for each sequential write stream of a multitude of sequential write streams merged for writing to the SSD over a first time interval;
   a time module for execution by the circuitry to determine separate wrap around times for each sequential write stream based on respective monitored separate write rates by the monitor module; and
   a match module for execution by the circuitry to cause the separate wrap around times for each sequential write stream to substantially match for subsequent writes to the SSD following the first time interval.

2. The apparatus of claim 1, the time module to determine separate wrap around times based on a given wrap around time being a time difference between a first time data is written to a given block of memory at the SSD and a second time for which the data is invalidated.

3. The apparatus of claim 1, the multitude of sequential write streams generated by one or more file systems implemented by an operating system of the host computing platform, the one or more file systems capable of using write-append techniques to write data to a memory of the host computing platform and then cause the write-appended data to be written to the SSD via the multitude of sequential write streams.

4. The apparatus of claim 3, the operating system executed by the circuitry for the host computing platform, the monitor module, the time module and the match module comprising a scheduler implemented by the operating system, the scheduler capable of merging the multitude of sequential write streams for writing to the SSD.

5. The apparatus of claim 1, comprising the match module to cause the separate wrap around times for each sequential write stream to substantially match such that a ratio of actual writes to the SSD to writes from the multitude of sequential write streams is substantially equal to a value of 1.0.

6. The apparatus of claim 1, the match module to cause the separate wrap around times for each sequential write stream to substantially match comprises the match module to cause a load balancing of an amount of data to be written to the SSD over a second time interval between the multitude of sequential write streams such that first and second write streams of the multitude of sequential write streams having different write rates are load-balanced by the match module to cause the amount of data to be written to the SSD by the respective first and second write streams over the second time interval to be adjusted, the adjusted amount of data to cause the wrap around times to substantially match for the first and second write streams.

7. The apparatus of claim 1, the match module to cause the separate wrap around times for each sequential write stream to substantially match comprises the match module to cause a throttling of write rates for at least some write streams of the multitude of sequential write streams such that a first write stream of the multitude of sequential write streams having a shorter first wrap around time compared to a second write stream of the multitude of sequential write streams has a throttled write rate to cause the wrap around times to substantially match for the first and second write streams.

8. The apparatus of claim 1, the match module to cause the separate wrap around times for each sequential write stream to substantially match comprises the match module to cause an adjustment to allocated portions allocated to each sequential write stream merged for writing to the SSD such that a larger portion is allocated to a first write stream of the multitude of sequential write streams that has a shorter determined wrap around time compared to a second write stream of the multitude of sequential write streams, the larger allocated portion to the first write stream to cause the wrap around times to substantially match for the first and second write streams.

9. The apparatus of claim 8, comprising:
   the monitor module to monitor separate write rates for each sequential write stream of the multitude of sequential write streams merged for writing to the SSD over a second time interval;
   the time module to determine a second set of separate wrap around times for each sequential write stream based on respective monitored separate write rates over the second time interval by the monitor module; and
   the match module to cause the second set of separate wrap around times for each sequential write stream to substantially match for writes to the SSD following the second time interval.

10. The apparatus of claim 1, comprising the SSD including at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

11. A method comprising:
    monitoring separate write rates to a solid state drive (SSD) for each sequential write stream of a multitude of sequential write streams merged for writing to the SSD over a first time interval;
    determining separate wrap around times for each sequential write stream based on respective monitored separate write rates; and
    causing the separate wrap around times for each sequential write stream to substantially match for subsequent writes to the SSD following the first time interval.

12. The method of claim 11, the multitude of sequential write streams generated by one or more file systems implemented by an operating system of the host computing platform, the one or more file systems capable of using write-append techniques to write data to a memory of the host computing platform and then cause the write-appended data to be written to the SSD via the multitude of sequential write streams.

13. The method of claim 11, comprising causing the separate wrap around times for each sequential write stream to substantially match such that a ratio of actual writes to the SSD to writes from the multitude of sequential write streams is substantially equal to a value of 1.0.

14. The method of claim 11, causing the separate wrap around times for each sequential write stream to substantially match comprises:

load balancing an amount of data to be written to the SSD over a second time interval between the multitude of sequential write streams such that first and second write streams of the multitude of sequential write streams having different write rates are load-balanced by adjusting the amount of data to be written to the SSD by the respective first and second write streams over the second time interval, the adjusted amount of data capable of causing the wrap around times to substantially match for the first and second write streams.

15. The method of claim 11, causing the separate wrap around times for each sequential write stream to substantially match comprises:
throttling write rates for at least some write streams of the multitude of sequential write streams such that a first write stream of the multitude of sequential write streams having a shorter first wrap around time compared to a second write stream of the multitude of sequential write streams has a throttled write rate capable of causing the wrap around times to substantially match for the first and second write streams.

16. The method of claim 11, causing the separate wrap around times for each sequential write stream to substantially match comprises:
adjusting allocated portions allocated to each sequential write stream merged for writing to the SSD such that a larger portion is allocated to a first write stream of the multitude of sequential write streams that has a shorter determined wrap around time compared to a second write stream of the multitude of sequential write streams, the larger allocated portion to the first write stream capable of causing the wrap around times to substantially match for the first and second write streams.

17. The method of claim 11, comprising:
monitoring separate write rates for each sequential write stream of the multitude of sequential write streams merged for writing to the SSD over a second time interval;
determining a second set of separate wrap around times for each sequential write stream based on respective monitored separate write rates over the second time interval; and
causing the second set of separate wrap around times for each sequential write stream to substantially match for writes to the SSD following the second time interval.

18. At least one machine readable medium comprising a plurality of instructions that in response to being executed on system at a host computing platform cause the system to:
monitor separate write rates for each sequential write stream of a multitude of sequential write streams merged for writing to a solid state drive (SSD) coupled with the host computing platform over a first time interval;
determine separate wrap around times for each sequential write stream based on respective monitored separate write rates; and
cause the separate wrap around times for each sequential write stream to substantially match for subsequent writes to the SSD following the first time interval.

19. The at least one machine readable medium of claim 18, the multitude of sequential write streams generated by one or more file systems implemented by an operating system of the host computing platform, the one or more file systems capable of using write-append techniques to write data to a memory of the host computing platform and then cause the write-appended data to be written to the SSD via the multitude of sequential write streams.

20. The at least one machine readable medium of claim 18, comprising causing the separate wrap around times for each sequential write stream to substantially match such that a ratio of actual writes to the SSD to writes from the multitude of sequential write streams is substantially equal to a value of 1.0.

21. The at least one machine readable medium of claim 18, cause the separate wrap around times for each sequential write stream to substantially match comprises the instructions to cause the system to:
load balance an amount of data to be written to the SSD over a second time interval between the multitude of sequential write streams such that first and second write streams of the multitude of sequential write streams having different write rates are load-balanced by adjusting the amount of data to be written to the SSD by the respective first and second write streams over the second time interval, the adjusted amount of data to cause the wrap around times to substantially match for the first and second write streams.

22. The at least one machine readable medium of claim 18, cause the separate wrap around times for each sequential write stream to substantially match comprises the instructions to cause the system to:
throttle write rates for at least some write streams of the multitude of sequential write streams such that a first write stream of the multitude of sequential write streams having a shorter first wrap around time compared to a second write stream of the multitude of sequential write streams has a throttled write rate to cause the wrap around times to substantially match for the first and second write streams.

23. The at least one machine readable medium of claim 18, cause the separate wrap around times for each sequential write stream to substantially match comprises the instructions to cause the system to:
adjust allocated portions allocated to each sequential write stream merged for writing to the SSD such that a larger portion is allocated to a first write stream of the multitude of sequential write streams that has a shorter determined wrap around time compared to a second write stream of the multitude of sequential write streams, the larger allocated portion to the first write stream to cause the wrap around times to substantially match for the first and second write streams.

24. The at least one machine readable medium of claim 18, comprising the instructions to further cause the system to:
monitor separate write rates to the SSD for each sequential write stream of the multitude of sequential write streams merged for writing to the SSD over a second time interval;
determine a second set of separate wrap around times for each sequential write stream based on respective monitored separate write rates over the second time interval; and
cause the second set of separate wrap around times for each sequential write stream to substantially match for writes to the SSD following the second time interval.

25. The at least one machine readable medium of claim 18, the SSD including at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

* * * * *